US009056536B2

(12) United States Patent
Bartoli

(10) Patent No.: US 9,056,536 B2
(45) Date of Patent: Jun. 16, 2015

(54) ADJUSTABLE LENGTH ELECTRICAL CONNECTOR FOR A TRACTOR TRAILER ASSEMBLY WITH DISCONNECT HANDLE AND METHOD THEREFOR

(71) Applicant: Albert Bartoli, Las Vegas, NV (US)

(72) Inventor: Albert Bartoli, Las Vegas, NV (US)

( * ) Notice: Subject to any disclaimer, the term of this patent is extended or adjusted under 35 U.S.C. 154(b) by 0 days.

(21) Appl. No.: 14/462,277

(22) Filed: Aug. 18, 2014

(65) Prior Publication Data

US 2015/0064936 A1 Mar. 5, 2015

Related U.S. Application Data

(60) Provisional application No. 61/870,359, filed on Aug. 27, 2013.

(51) Int. Cl.

| | |
|---|---|
| ***H01R 33/00*** | (2006.01) |
| ***B60D 1/64*** | (2006.01) |
| ***H01R 13/639*** | (2006.01) |
| ***H01R 13/52*** | (2006.01) |
| ***H01R 13/62*** | (2006.01) |
| ***H01R 13/717*** | (2006.01) |
| ***H01R 31/06*** | (2006.01) |
| *B60D 1/00* | (2006.01) |

(52) U.S. Cl.

CPC ................ *B60D 1/64* (2013.01); *H01R 13/639* (2013.01); *H01R 13/5202* (2013.01); *H01R 13/62* (2013.01); *H01R 13/7175* (2013.01); *B60D 2001/008* (2013.01); *H01R 31/06* (2013.01)

(58) Field of Classification Search

CPC ............ H01R 13/639; H01R 13/6395; H01R 13/6335; H05K 7/1409; B61G 5/10

USPC ........................... 439/35, 144, 160, 372, 352

See application file for complete search history.

(56) References Cited

U.S. PATENT DOCUMENTS

| | | | | |
|---|---|---|---|---|
| 4,005,922 | A | 2/1977 | Burkhart et al. | |
| 4,061,407 | A | 12/1977 | Snow | |
| 4,154,495 | A * | 5/1979 | Crewse | 439/35 |
| 4,784,610 | A | 11/1988 | Stuart | |
| 4,786,261 | A | 11/1988 | Ramos | |
| 4,793,819 | A | 12/1988 | Bert | |
| 5,224,874 | A | 7/1993 | Sell | |
| 5,302,141 | A * | 4/1994 | O'Reilly et al. | 439/680 |
| 5,593,313 | A * | 1/1997 | Shibuya et al. | 439/373 |
| 5,860,827 | A * | 1/1999 | Lee | 439/373 |
| 6,162,085 | A | 12/2000 | Chugh et al. | |
| 6,336,822 | B1 | 1/2002 | Luzzoli | |
| 6,450,833 | B1 | 9/2002 | Brown, Jr. et al. | |
| 6,554,626 | B2 | 4/2003 | Ramos, Jr. | |
| 6,802,725 | B2 * | 10/2004 | Rowland et al. | 439/144 |
| 7,097,469 | B2 | 8/2006 | Jacobs | |
| 7,331,792 | B2 | 2/2008 | Cummings et al. | |
| 7,513,791 | B1 * | 4/2009 | Gary | 439/373 |
| 7,575,450 | B2 | 8/2009 | Williams et al. | |
| 7,722,380 | B1 * | 5/2010 | West et al. | 439/373 |

* cited by examiner

*Primary Examiner* — Neil Abrams
*Assistant Examiner* — Travis Chambers
(74) *Attorney, Agent, or Firm* — Weiss & Moy P.C.; Jeffrey D. Moy

(57) ABSTRACT

An electrical connector plug configured for use with tractor-trailers has an elongated housing having a hollow interior. A female electrical connector is coupled to a first end of the housing. An electrical cable is coupled to a second end of the housing. A ridge member is formed on a top surface of the housing. A collar is movable along a length of the housing. A locking mechanism is used to secure the collar at different lengths on the housing. A handle is hingly coupled to the collar to disengage the electrical connector plug from an electrical connector.

20 Claims, 3 Drawing Sheets

10 16 46 34 36 34A 28 22A 14 12 40 22 24 52 42 40 54 26 Power Supply 204 20 20B 38

46A 36 34A 16 46 22A 22 28 12 40 20 14 46A 34

ADJUSTABLE LENGTH ELECTRICAL CONNECTOR FOR A TRACTOR TRAILER ASSEMBLY WITH DISCONNECT HANDLE AND METHOD THEREFOR

RELATED APPLICATIONS

This patent application is related to U.S. Provisional Application No. 61/870,359, filed Aug. 27, 2013, entitled "AN ADJUSTABLE LENGTH ELECTRICAL CONNECTOR FOR A TRACTOR-TRAILER ASSEMBLY WITH DISCONNECT HANDLE AND METHOD THEREOF" in the name of the same inventor stated above, and which is incorporated herein by reference in its entirety. The present patent application claims the benefit under 35 U.S.C §119(e)

TECHNICAL FIELD

The invention relates generally to an electrical connector assembly for a tractor-trailer, and more particularly to an electrical connector whose length may be adjusted to fit into any tractor-trailer assembly and that further has a disconnect handle for disengaging the electrical connector assembly.

BACKGROUND

In tractor-trailer vehicles, it is generally necessary to supply power from the electrical system of the tractor to the trailer that is being towed. The power is generally necessary in order to operate the trailer lights, anti-skid devices and the like on the trailer. In general, a plug member and receptacle assembly may be used for detachably connecting the electrical system of the trailer to that of the tractor. The receptacle member is generally mounted in the front panel of the trailer and the plug member is electrically connected to the end of an electrical cable carrying an electrical current from the tractor to the trailer.

The receptacle member usually has a cylindrical metallic body which encloses a plurality of electrically conductive prongs. The plug member generally has a corresponding number of electrically conductive bores adapted to receive the prongs when the plug is inserted in the receptacle. An annular flange may be provided about the cylindrical body of the receptacle for securing it to the panel of the trailer.

One problem with current electrical plugs for use on tractor-trailer vehicles is that there are different types of receptacle members. The different types of receptacle members each have different depths/angles for receiving the electrical plugs. Thus, since most drivers do not switch out the electrical plug for the different receptacle members, certain electrical plugs may not be securely fitted within the receptacle members and may shake loose from the receptacle member due to vibrations while the tractor-trailer vehicle is operated.

Another problem with the current plug member and receptacle assembly for tractor-trailer vehicles is that current plug member and receptacle assemblies provide no indication if there is a secure connection between the plug member and the receptacle assembly. Thus, even if the plug member is positioned within the receptacle assembly, a person has no way of telling if all trailer systems that need power are properly powered and connected.

Therefore, it would be desirable to provide a system and method that overcomes the above.

SUMMARY

This summary is provided to introduce a selection of concepts in a simplified form that are further described below in the DESCRIPTION OF THE APPLICATION. This summary is not intended to identify key features of the claimed subject matter, nor is it intended to be used as an aid in determining the scope of the claimed subject matter In accordance with one embodiment, an electrical connector plug configured for use with tractor-trailers is provided. The electrical connector plug has an elongated housing having a hollow interior. A female electrical connector is coupled to a first end of the housing. An electrical cable is coupled to a second end of the housing. A ridge member is formed on a top surface of the housing. A collar is movable along a length of the housing. A locking mechanism is used to secure the collar at different lengths on the housing. A handle is hingly coupled to the collar to disengage the electrical connector plug from an electrical connector.

In accordance with one embodiment, an electrical connector plug configured for use with tractor-trailers is provided. The electrical connector plug has an elongated housing having a hollow interior. A female electrical connector is coupled to a first end of the housing. An electrical cable is coupled to a second end of the housing. A ridge member is formed on a top surface of the housing. A collar is movable along a length of the housing. A locking mechanism is used to secure the collar at different lengths on the housing. A handle is hingly coupled to the collar to disengage the electrical connector plug from an electrical connector. A plurality of indicator lights is coupled to the housing. The indicator lights configured to illuminate when an electrical connection is formed between the electrical connector plug and the electrical connector. A flashlight is coupled to the housing and power through the electrical cable.

In accordance with one embodiment, an electrical connector plug configured for use with tractor-trailers is provided. The electrical connector plug has an elongated housing having a hollow interior. A female electrical connector is coupled to a first end of the housing. A quick release button formed on the female electrical connector and extending through an opening formed in the housing An electrical cable is coupled to a second end of the housing. A ridge member is formed on a top surface of the housing. A collar is movable along a length of the housing. A locking mechanism is used to secure the collar at different lengths on the housing. A handle is hingly coupled to the collar to disengage the electrical connector plug from an electrical connector. The handle is a "Y" shaped handle. A plurality of indicator lights is coupled to the housing. The indicator lights configured to illuminate when an electrical connection is formed between the electrical connector plug and the electrical connector. A flashlight is coupled to the housing and power through the electrical cable

BRIEF DESCRIPTION OF DRAWINGS

The novel features believed to be characteristic of the application are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The application itself, however, as well as a preferred mode of use, further objectives and advantages thereof, will be best understood by reference to the following detailed description of illustrative embodiments when read in conjunction with the accompanying drawings, wherein:

DESCRIPTION OF THE APPLICATION

Figure 1:
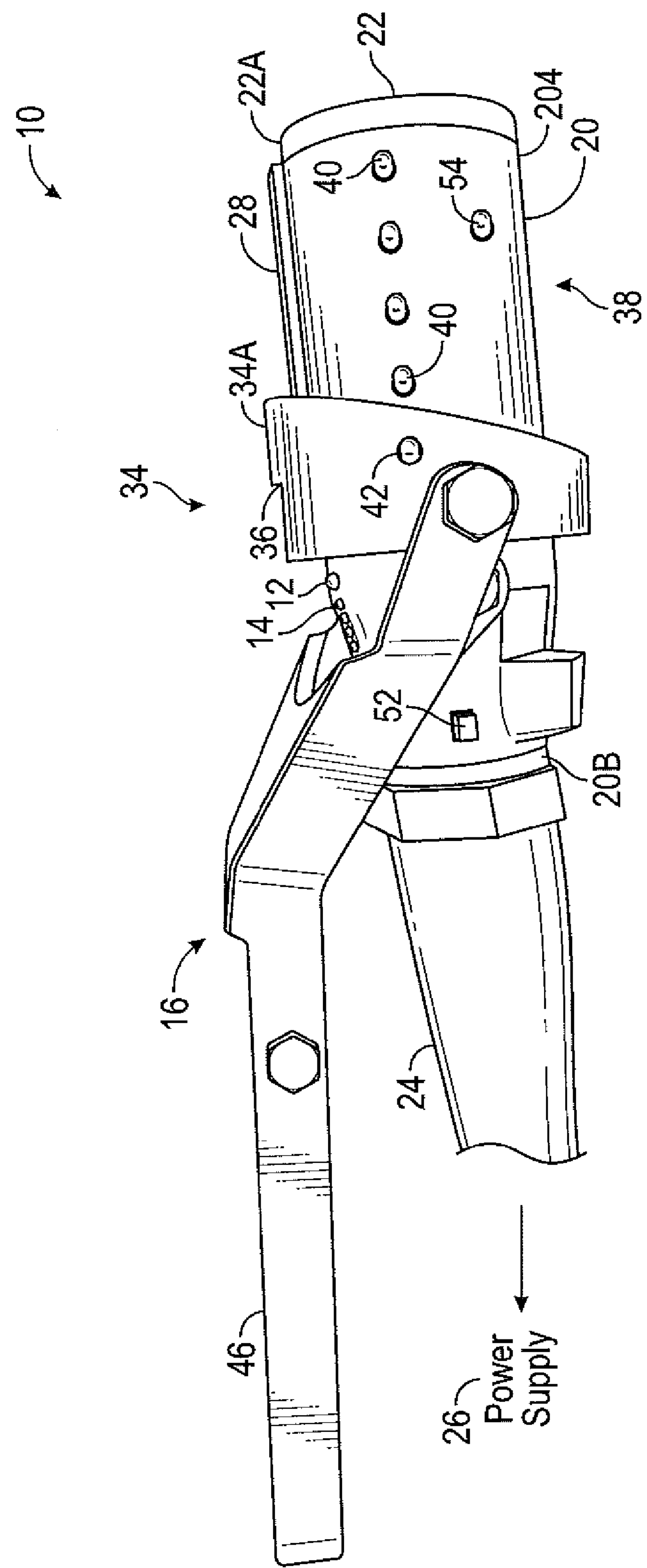
FIG. 1 is a side view of the electrical connector having an adjustable length of the present invention.
Figure 2:
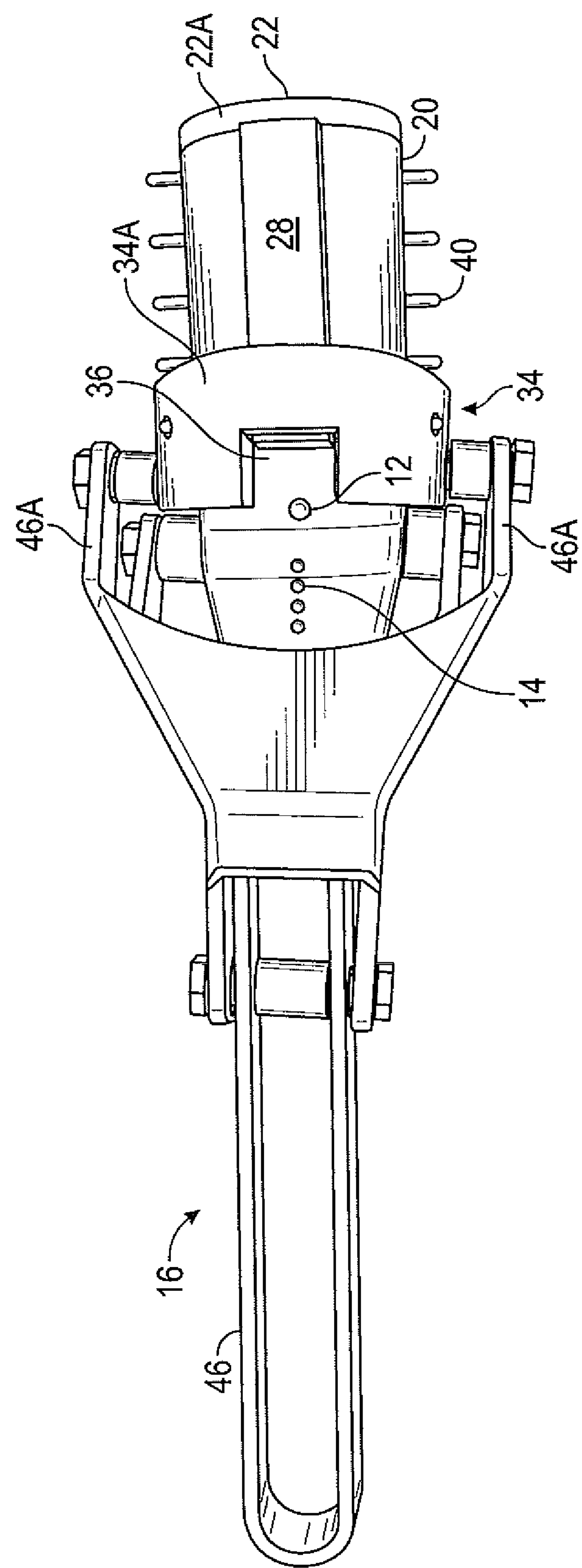
FIG. 2 is a top view of the electrical connector having an adjustable length of the present invention.
Figure 3:
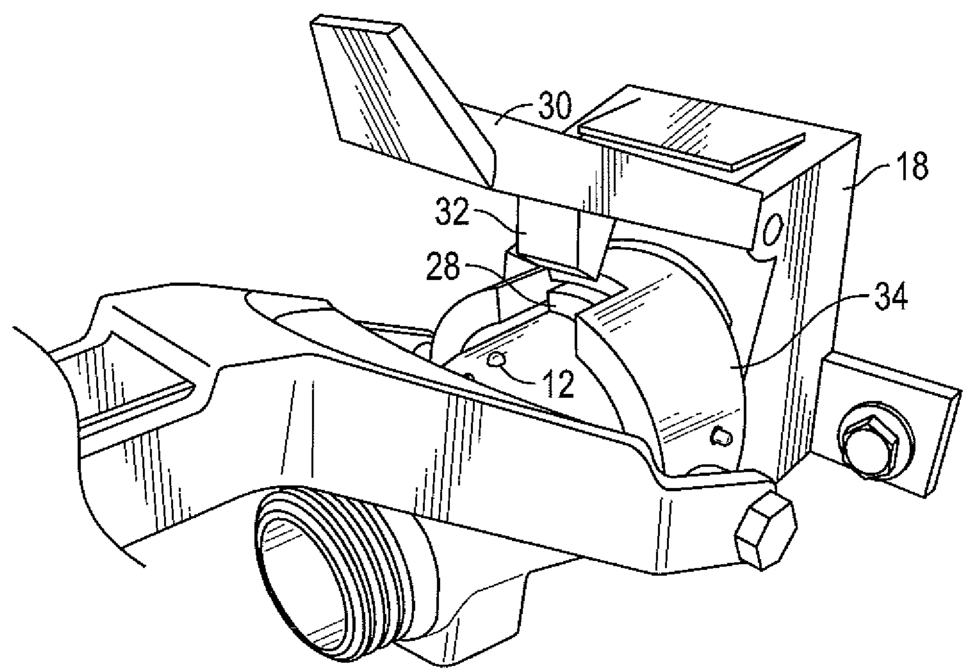
FIG. 3 is a perspective view of the electrical connector having an adjustable length of the present invention inserted into an electrical receptacle.

The description set forth below in connection with the appended drawings is intended as a description of presently preferred embodiments of the application and is not intended to represent the only forms in which the present application can be constructed and/or utilized. The description sets forth the functions and the sequence of steps for constructing and operating the application in connection with the illustrated embodiments. It is to be understood, however, that the same or equivalent functions and sequences can be accomplished by different embodiments that are also intended to be encompassed within the spirit and scope of this application.

Referring to the Figures, a plug member 10 for use in a tractor-trailer vehicle is shown. In general, the tractor trailer vehicle may be comprised of a tractor which is configured to pull a trailer. The tractor generally supplies power to run different systems of the trailer such as the trailer lights, anti-skid devices and the like on the trailer. The plug member 10 is designed to be adjustable in length so that plug member 10 may properly fit into different types of receptacle members 18 each have different depths/angles for receiving the plug member 10. The plug member 10 is further designed to have a plurality of indicator lights 14. The indicator lights 14 are used to provide a visual indication that the plug member 10 is properly connected to the receptacle member and an electrical connection is made. The plug member 10 further has a release mechanism 16. The release mechanism 16 may be used to disengage and remove the plug member 10 from the receptacle member 18. While the plug member 10 is described as being used in a tractor-trailer vehicle, the plug member 10 may be used with other vehicles used to tow a trailer. For example, the plug member 10 may be used with a recreational vehicle (RV) towing a trailer, a car/truck towing a trailer, or the like.

The plug member 10 may be comprised of an elongated housing 20. The housing 20 is generally a hollow housing and may be formed by die casting the housing 20 from various different metals. The housing 20 generally has a front section 20A and a rear section 20B. The front section 20A may be used to house a female electrical connector 22 which is positioned within the housing 20. A sealing lip 22A may be formed around an outer perimeter of the front section 20A of the housing 20. The sealing lip 22A may be used to prevent moisture and other elements from collecting within the housing 20. An electrical cable 24 may be coupled to the rear section 20B of the housing 20. In general the female electrical connector 22 is coupled to wires from the electrical cable 24. The electrical cable 24 is generally connected to a power supply 26.

The female electrical connector 22 may have a quick release button 54. The quick release button extends through an opening 56 formed through the housing 20. The quick release button 54 may allow one to quickly secure the female electrical connector 22 to the housing 20 as well as quickly release the female electrical connector 22 from the housing 20.

Located on a top surface of the housing 20 is a ridge member 28. As shown in the Figures, the ridge member 28 may run approximately half a length of the housing 20. However, this is shown only as an example. The ridge member 28 may extend a longer or shorter length without departing from the spirit and scope of the present invention. The ridge member 28 is configured to act as a locking tab to secure the plug member 10 within the receptacle member 18.

The receptacle member 18 generally has a cap member 30. The cap member 30 may be hingly coupled to the receptacle member 18. The cap member 30 may be used to cover the receptacle member 18 to prevent the water, dirt of other elements from entering into the receptacle member 18 when the receptacle member 18 is not in use. The cap member 30 may have a tab member 32 formed thereon. The tab member 32 of the cap member engages the ridge member 28 when the plug member 10 is inserted into the receptacle member 18 thereby locking the plug member 10 in the receptacle member 18.

A collar 34 may be movable coupled to the housing 20. In accordance with on embodiment, the collar 34 slides along a length of the housing 20. The collar 34 may be formed of a ring member 34A. The ring member 34A may have a notch 36 formed in a top surface thereof. The notch 36 may be configured to act as a second locking tab. The notch 36 works together with tab member 32 formed on the cap member 30. Thus, the tab member 32 formed on the cap member 30 may engage both the ridge member 28 formed on the housing 20 as well as notch 36 formed on the ring member 34A to form a dual locking system.

A locking mechanism 38 may be used to secure the collar to the housing 20. The locking mechanism 38 allows the collar 34 to be locked along different lengths of the housing 20. In the embodiment depicted in the Figures, the locking mechanism 38 may be comprised of a plurality of locking pins 40 formed on the housing 20 and one or more locking holes 42 formed on the collar 34. In accordance with one embodiment, a locking hole 42 may be formed on each side of the collar 34 and axially aligned. The locking pins 40 may be provided in pairs and run along a length of the housing 20. The locking pins 40 may be configured to engage the locking holes 42 formed in the collar 34 to secure the collar 34 in a desired position. In accordance with one embodiment, the locking pins 40 may be spring loaded pins.

The plug member 10 may have a release mechanism 16 formed thereon. The release mechanism 16 may be used to disengage and remove the plug member 10 from the receptacle member 18. In accordance with one embodiment, the release mechanism 16 may be a handle 46 hingly coupled to the collar 34. The handle 46 may be a "Y" shaped handle wherein the leg members 46A of the "Y" shaped handle 46 are hingly coupled to the collar 34. When the "Y" shaped handle 46 is raised, the intersection of the leg members 46A pushes against the receptacle member 18 disengaging the plug member 10 from the receptacle member 18.

The housing 20 may have a plurality of indicator lights 14 formed thereon. The indicator lights 14 may be used to show if the plug member 10 is properly connected to the receptacle member 18 and an electrical connection is established. Each indicator light 14 may be coupled to one of the systems on the trailer that is powered by the electrical connection between the plug member 10 and the receptacle member 18. If a system on the trailer is properly receiving power, the corresponding indicator light 14 will illuminate. If one of the systems on the trailer is not receiving power, the corresponding indicator light 14 will not illuminate. In accordance with one embodiment, the indicator lights 14 may be Light Emitting Diodes (LEDs).

A high intensity light 12 may also be formed on the housing 20. The high intensity light 12 may receive power from the power supply 26. Since the high intensity light 12 is coupled to the power supply, the high intensity light 50 will illuminate and function as a flashlight. A switch 52 may be coupled to the high intensity light 12 to allow one to activate and deactivate the high intensity light 12.

While embodiments of the disclosure have been described in terms of various specific embodiments, those skilled in the art will recognize that the embodiments of the disclosure may be practiced with modifications within the spirit and scope of the claims.

What is claimed is:

1. An electrical connector plug configured for use with tractor-trailers comprising:

an elongated housing having a hollow interior;

a female electrical connector coupled to a first end of the housing;

an electrical cable coupled to a second end of the housing;

a ridge member formed on a top surface of the housing;

a collar movable along a length of the housing;

a locking mechanism to secure the collar at different lengths on the housing; and a handle hingly coupled to the collar to disengage the electrical connector plug from an electrical connector.

2. The electrical connector plug in accordance with claim 1, further comprising a sealing lip formed around an outer perimeter of the first end of the housing.

3. The electrical connector plug in accordance with claim 1, further comprising a quick release button formed on the female electrical connector and extending through an opening formed in the housing.

4. The electrical connector plug in accordance with claim 1, wherein the handle is a “Y” shaped handle.

5. The electrical connector plug in accordance with claim 1, further comprising a flashlight coupled to the housing.

6. The electrical connector plug in accordance with claim 1, wherein the collar comprises:

a ring member; and a notch formed on a top section of the ring member.

7. The electrical connector plug in accordance with claim 6, wherein the locking mechanism comprises:

a plurality of locking pins positioned along the length of the housing;

locking holes formed through the ring member.

8. The electrical connector plug in accordance with claim 1, further comprising a plurality of indicator lights coupled to the housing, the indicator lights configured to illuminate when an electrical connection is formed between the electrical connector plug and the electrical connector.

9. The electrical connector plug in accordance with claim 8, wherein the plurality of indicator lights are Light Emitting Diodes (LEDs).

10. An electrical connector plug configured for use with tractor-trailers comprising:

an elongated housing having a hollow interior;

a female electrical connector coupled to a first end of the housing;

an electrical cable coupled to a second end of the housing;

a ridge member formed on a top surface of the housing;

a collar movable along a length of the housing;

a locking mechanism to secure the collar at different lengths on the housing;

a handle hingly coupled to the collar to disengage the electrical connector plug from an electrical connector;

a plurality of indicator lights coupled to the housing, the indicator lights configured to illuminate when an electrical connection is formed between the electrical connector plug and the electrical connector; and a flashlight coupled to the housing and power through the electrical cable.

11. The electrical connector plug in accordance with claim 10, further comprising a sealing lip formed around an outer perimeter of the first end of the housing.

12. The electrical connector plug in accordance with claim 10, further comprising a quick release button formed on the female electrical connector and extending through an opening formed in the housing.

13. The electrical connector plug in accordance with claim 10, wherein the handle is a “Y” shaped handle.

14. The electrical connector plug in accordance with claim 10, wherein the plurality of indicator lights are Light Emitting Diodes (LEDs).

15. The electrical connector plug in accordance with claim 10, wherein the collar comprises:

a ring member; and a notch formed on a top section of the ring member.

16. The electrical connector plug in accordance with claim 15, wherein the locking mechanism comprises:

a plurality of locking pins positioned along the length of the housing;

locking holes formed through the ring member.

17. An electrical connector plug configured for use with tractor-trailers comprising:

an elongated housing having a hollow interior;

a female electrical connector coupled to a first end of the housing;

a quick release button formed on the female electrical connector and extending through an opening formed in the housing;

an electrical cable coupled to a second end of the housing;

a ridge member formed on a top surface of the housing;

a collar movable along a length of the housing;

a locking mechanism to secure the collar at different lengths on the housing;

a handle hingly coupled to the collar to disengage the electrical connector plug from an electrical connector, wherein the handle is a “Y” shaped handle;

a plurality of indicator lights coupled to the housing, the indicator lights configured to illuminate when an electrical connection is formed between the electrical connector plug and the electrical connector; and a flashlight coupled to the housing and power through the electrical cable.

18. The electrical connector plug in accordance with claim 17, further comprising a sealing lip formed around an outer perimeter of the first end of the housing.

19. The electrical connector plug in accordance with claim 17, wherein the collar comprises:

a ring member; and a notch formed on a top section of the ring member.

20. The electrical connector plug in accordance with claim 17, wherein the locking mechanism comprises:

a plurality of locking pins positioned along the length of the housing;

locking holes formed through the ring member.

* * * * *